Aug. 9, 1960    W. D. WHITE    2,948,892
PRECISION INDICATING RADAR SYSTEM
Filed Sept. 28, 1949    3 Sheets-Sheet 1
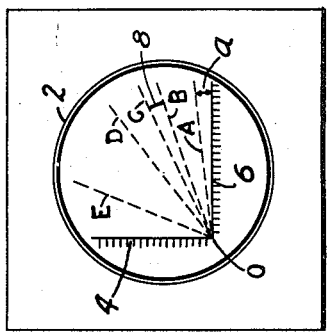
FIG.I.
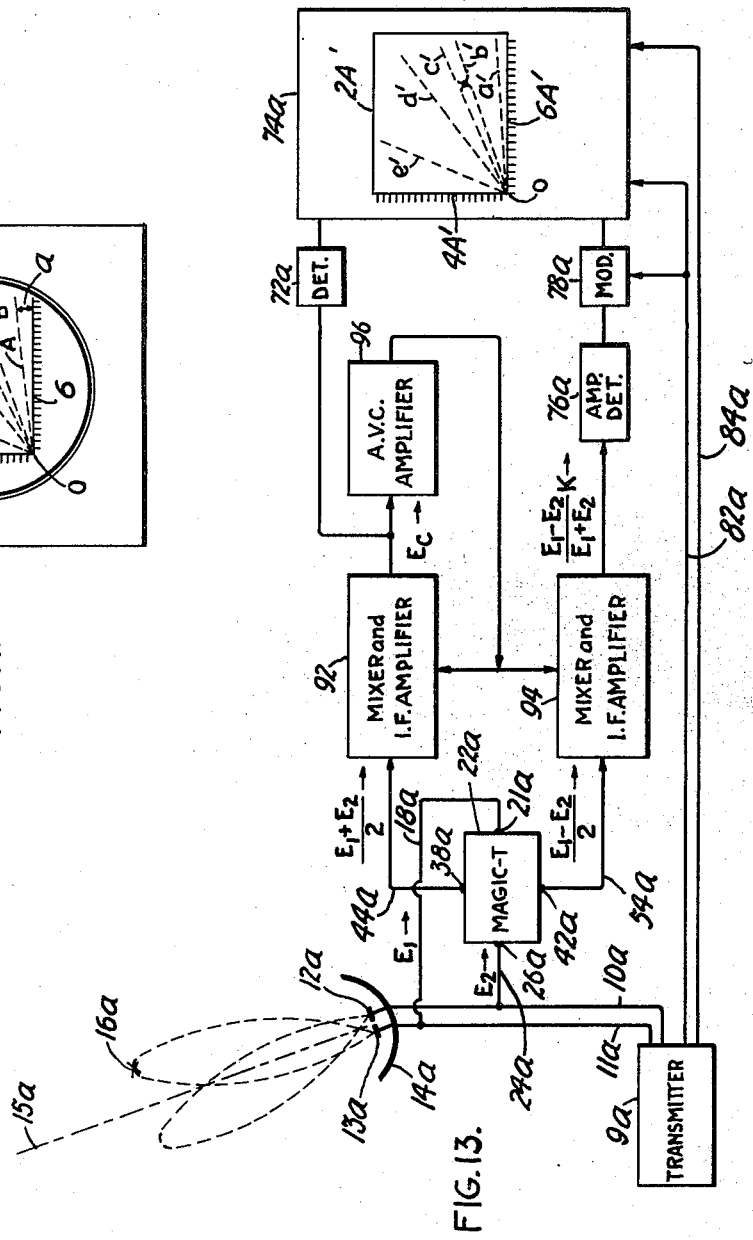
FIG.13.
INVENTOR
WARREN D. WHITE
BY
Curtis, Morris & Safford
ATTORNEYS

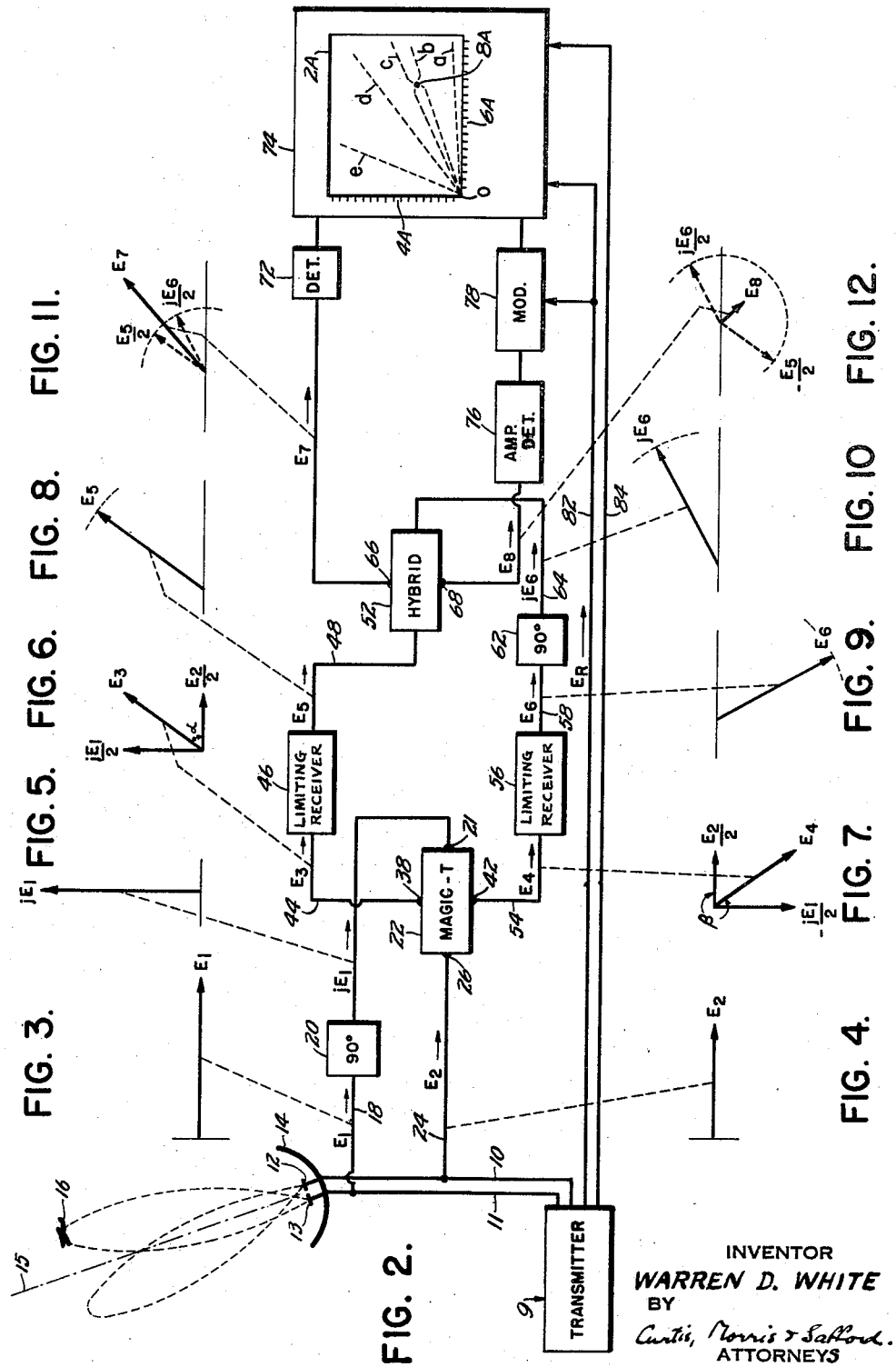

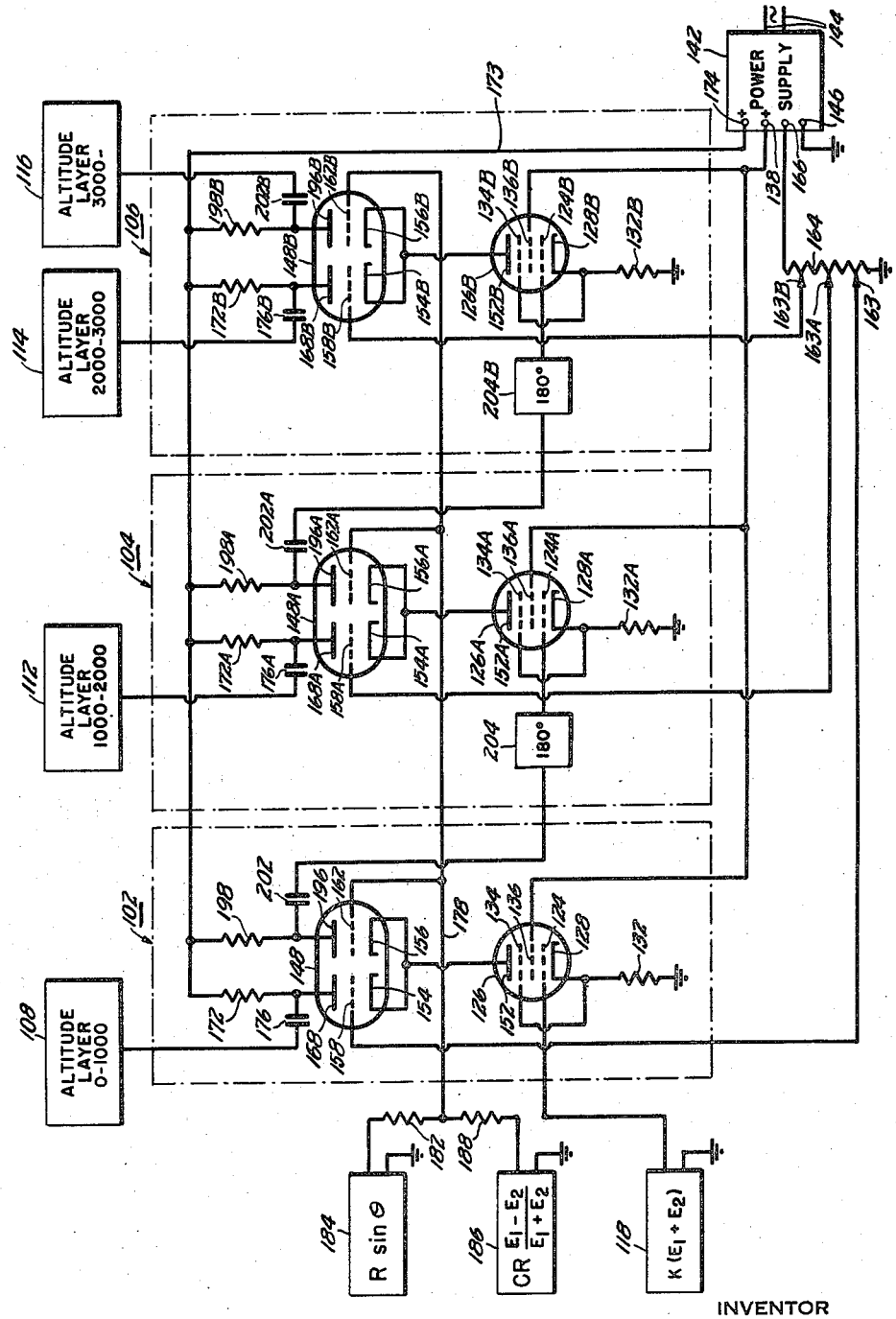

United States Patent Office 2,948,892
Patented Aug. 9, 1960

2,948,892

PRECISION INDICATING RADAR SYSTEM

Warren D. White, West Hempstead, N.Y., assignor, by mesne assignments, to Cutler-Hammer, Inc., Milwaukee, Wis., a corporation of Delaware Filed Sept. 28, 1949, Ser. No. 118,400

24 Claims. (Cl. 343—5)

This invention is in the field of radar. It is described as embodied in a radar system for determining the height and range of target objects and their bearing in azimuth with reference to the radar antenna, and is directed particularly toward improving the accuracy of indication of such systems.

In radar systems, energy is radiated and received by directional antennas, so that the energy radiated from the antenna is confined in a beam, much as a beam of light from a searchlight. The radar energy is sent out in brief intermittent pulses, and whenever a target object is within the radar beam some energy is reflected back to the antenna. This reflected energy is used to give an indication, usually on a viewing screen, that a target is within the beam.

The distance from the antenna to the target object is measured by the length of time which it takes transmitted radio waves to travel to and return from the reflecting object. The direction of the target object is determined from the direction of the axis of the antenna, that is, from the direction in which the radiated beam is pointed. The beam of energy from the antenna diverges, however, so that the cross-sectional area of the beam increases at progressively greater distances from the antenna, rendering the location of an object less precise as the distance between the antenna and the object increases. The target object, such as an aircraft, may be at a relatively great distance from the radar antenna, so that it occupies only a small part of the cross-sectional area of the divergent radar beam. Thus, the actual direction to the target may be somewhat different from that which is indicated by the direction of the axis of the antenna.

In some radar systems, the antenna moves continuously, periodically scanning the same pattern, and the radar information may be presented on a cathode-ray viewing screen arranged to display all of the targets detected by the radar system. Other auxiliary indicators are sometimes used, such as range-height indicators, which may be arranged to indicate the range and height of all the targets in a particular azimuth direction. It is often important to know accurately the precise height of the indicated targets, but in such systems, the target will be visible from the time the radar beam first intercepts the target until the scanning movement of the antenna has moved the beam past the target, thus rendering it difficult to determine the precise location of the target.

Figure 1 shows the display of such a range-height indicator. The display is presented on the face of a cathode-ray tube 2 which is provided with coordinates 4 and 6 calibrated in terms of height and horizontal range (distance), respectively. In this system, the antenna scans a vertical path, which may or may not be accompanied by rotary, azimuthal scanning, motion depending upon the use for which the radar is adapted; however, for this illustration we are concerned only with the vertical scanning motion of the antenna and the width of the radiated beam in a vertical direction.

As the antenna scans in a vertical direction, the scanning path of the electron beam of the cathode-ray tube assumes a corresponding position. This can be explained best by assuming, for example, that when the antenna is directed at an angle "$a$" from the horizontal, the beam of electrons starts from an origin "O" at the instant the pulse is transmitted by the antenna, and travels outwardly, along the scanning path indicated by the broken-line A, at a speed which is correlated with the speed of the radio waves so that the scale 6 is calibrated in convenient units of distance. As the antenna is tilted at greater angles from the horizontal the scanning path on the display tube 2 assumes corresponding angles as indicated by broken-lines B, C, D, and E.

In practice, the intensity of the electron beam is normally maintained at such a low level that these scanning lines are not visible on the screen of the display tube 2, but whenever reflected energy is received, indicating the presence of a target within the antenna beam, the intensity of the scanning beam is increased and a spot of light is visible on the fluorescent screen of the display tube. Such a target is illustrated at 8 in Figure 1.

It will be noted that when the antenna beam is tilted at an angle corresponding to the scanning-line B, the target 8 is first visible. As the antenna continues to scan upwardly the target continues to be visible on the screen until the scanning line C is reached. The target therefore appears as an arcuate line segment on the viewing screen.

This line segment is made as the radar beam sweeps past the target. The true relative position of the target can then be determined from visual observation by estimating the center of this line segment. Such a visual estimation is difficult because the ends of the line segment may not be defined clearly, and for radar applications requiring precise data, more accurate methods are needed. In accordance with the present invention the target is made to appear on the screen as a small dot rather than a line segment.

As was indicated above, the antenna is usually being moved in some cyclical pattern so that there is usually only a brief portion of the total cycle when the target object is actually within the radar beam. Therefore, it is necessary that the mark upon the viewing screen should persist so that it can be seen during the times when the target object is not within the beam and no direct radar energy is being reflected from the target. By concentrating the energy which makes the mark on the screen in a small brilliant dot rather than a dimmer line segment, the target will remain visible for a longer period of time.

Various methods have been employed in the past for increasing the accuracy with which the true direction of the target object can be determined. One method is to use a more sharply focused radar beam, that is, one which diverges to a lesser extent. However, to produce such a sharp beam requires a larger antenna, which is more subject to wind loading, and which has more mass and is harder to move. Also with a radar beam of smaller cross-sectional area the target is within the beam during a smaller portion of the scanning sweep; so that fewer of the radar pulses strike the target during any given sweep. In other words, fewer "hits" on the target are made per scanning sweep, and less total energy is reflected from the target. This reflection, moreover, occurs during a shorter period of time. Thus, less marking energy is directed upon the viewing screen and the mark upon the screen is faint and is likely to "fade" before the next reoccurrence of marking energy. In other words, the use of a narrower radar beam results in a loss of sensitivity of detection, that is, it decreases the maximum useful range of the radar system.

Methods have been proposed for artificially narrowing the radar beam. These methods have the advantage that the effect of a narrow beam is obtained without the necessity for a large unwieldy antenna. One method for artificially narrowing the radar beam is to use a broad beam, and a narrower beam directed along the axis of the broad beam. A mark is made on the viewing screen only when the amount of energy from the narrower beam reflected by the target exceeds the amount of energy from the broad beam reflected by the target. This method, in effect, uses only the central portion of the narrower beam.

Another method for artificially narrowing the beam is to use an antenna which projects two overlapping beams or lobes. The target indicating mark is caused to appear on the viewing screen only when the amount of reflected energy is equally divided between the two beams.

Other arrangements involving arc-splitting and lobe-switching techniques have been proposed for obtaining increased resolution, but they have the serious disadvantage of reducing the number of "hits" per sweep and consequently reducing the useful range of the radar system.

In accordance with a preferred embodiment of the present invention, the energy is radiated and received by a double-lobe antenna structure in which the two beams overlap. The sum and difference of the two signals reflected by the target are obtained, separate receivers being provided for each beam. The signal corresponding to the sum of the received signals is used to control the intensity of the electron beam which produces the target indication, thus giving high sensitivity, and a second signal, which is a direct function of ratio of the difference signal to the sum signal, is used as a measure of the angle by which the direction of the target is displaced from the direction of the antenna; this signal is used to correct the position of the target on the visual display.

As the angle between the actual direction of the target and the line of the antenna axis becomes greater, the target moves relatively toward the center of one of the two beams, and toward the fringe of the other beam. The target is more intensely illuminated by the beam of which it more nearly approaches the center, and so more energy is reflected therefrom. The difference in the amount of energy from the two beams, thus, can be used as a measure of this angle. Since the absolute displacement of the target from the line of the axis of the antenna is the product of the sine of the angle of target displacement and target range, it is possible to multiply these two quantities and apply the result as a correction to the position of the mark upon the viewing screen. For the small angles of displacement usually encountered, the sine of the angle is very nearly equal to the angle itself; so the product of angle and range could be used. This correction has the effect of moving the marking energy from the ends of the line segment, which would have existed without the correction, and putting all of the marking energy into one small dot. The brilliance and persistence of the dot is improved and its position is more readily and accurately determined than from the uncorrected line segment mark. However, because the correction factor must be independent of the amplitude of the signal returned by the target, so that it will not be changed by changes in the effective area of the target etc., the correction signal should have a value which is a direct function of the ratio of the difference between the amplitude of the two received signals and the sum of the amplitudes of these signals.

This invention is applicable to height finders in which the data is presented on a range-height-indicator screen (R.H.I.) or to horizontal position indication in which the radar data is presented on a plan-position-indicator screen (P.P.I.). In the case of height finders, the double-lobe antenna is arranged so that the two axes of the beams of radar energy are directly above and below one another and in the case of horizontal position indication the two axes of the beams of radar energy are in the same approximately horizontal plane.

In some forms of height finders it is preferable to divide the atmosphere into various layers by altitude such, as for instance, from 0 to 1000 feet, and from 1000 to 2000 feet, etc., a viewing screen being provided to correspond with each of the various altitude layers. Such an altitude layer radar display is particularly adapted for use at aircraft landing field terminals. The present invention provides for the application of a correction factor to such a system, so that the heights of the targets are indicated accurately and the incoming signals are routed to the approximate altitude layer screen depending only upon the actual target height.

One aspect of the invention is directed to a radar system having improved visual presentation of radar data. Further, this aspect is directed to a radar system in which the visual presentation of the position of the target object is a small dot whose size is determined by the ultimate accuracy of the beam rather than the total beam width. Another aspect is directed to an improved form of radar presentation whereby the height and position of a target object can be more accurately determined on the customary R.H.I. or P.P.I. screens and other radar viewing screens, without sacrificing "hits" per scanning sweep of the antenna. Still another aspect of the invention is directed to a double beam antenna system in which the intensity of the mark, visually presenting the radar data received by the antenna, is controlled by the sum of the energy from the two beams which is reflected from the target, and in which the position of this mark is corrected in accordance with the difference in the energy from these two beams. A further aspect of the invention is to provide novel means in the altitude layer radar display system for routing the incoming signals to the appropriate viewing screen depending only on the height of the target.

The novel features I believe to be characteristic of my invention are set forth with particularity in the appended claims. My invention itself, however, both as to its manner of construction and method of operation, together with further objects and advantages thereof, may best be understood by reference to the following description, considered together with the accompanying drawings, in which:

Figure 1, as mentioned above, illustrates the usual visual indication of a target upon the viewing screen of a range-height indicator;

Figure 2 is a block diagram of a radar transmitter and receiver embodying my invention;

Figures 3 to 12 are vector diagrams for assistance in explaining the operation of the system;

Figure 13 is a modification of the radar system shown in Figure 2; and

Figure 14 is a schematic diagram of a gating circuit for use with an altitude-layer-surveillance radar presentation system.

As shown in Figure 2 of the drawings, the pulses of energy which are produced by a radar transmitter, generally indicated at 9, are conducted by two wave-guides 10 and 11 to two antenna excitation elements, 12 and 13, respectively. The transmitter 9 and the wave-guides 10 and 11 are arranged so that the elements 12 and 13 are excited in phase. These elements are positioned in front of a parabolic reflector 14 and offset from the focus thereof. This arrangement is well known and causes the two beams of electromagnetic energy to be radiated from the antenna-reflector assembly at opposite angles with respect to the projection of the axis of symmetry of the parabolic reflector, indicated by a broken line 15. The amount of overlap of the two beams depends upon the particular antenna construction employed. A useful degree of overlap is one in which the energy intensity in each of the two beams at the center of the overlap area is one-half of the maximum energy intensity of either of the two equal beams.

As mentioned above, the axes of the beams of radar energy may be located in different relative positions, depending upon the type of radar information being collected and also upon the direction in which the scanning sweeps of the antenna assembly are made. In a range-height finder, the two axes of the radar beam may be located one above the other, and the scanning sweeps may be made vertically. For this description it will be assumed that antenna element 13 radiates the top radar beam and antenna element 12 the lower beam. The same antenna elements are used for transmitting and receiving, suitable, well-known arrangements (not shown) being made for separating the transmitted and reflected pulses.

In order to describe the operation of the system, shown in Figure 2, it will be assumed that an aircraft target 16 is within the radar pattern projected by the antenna-reflector assembly and that the aircraft is displaced upwardly from the axis of the reflector so that the aircraft is nearer to the axis of the beam radiated by antenna element 13 than antenna element 12. Thus, the intensity of the energy hitting the target 16 is greater for the beam from element 13, and the strength of the reflected signal is greater for this beam; accordingly, a higher signal voltage will be induced in antenna element 13, when it is acting as a receiver, than will be induced in the antenna element 12. This condition is represented in Figures 3 and 4 by the voltage vectors $E_1$ and $E_2$, respectively.

The voltage $E_1$ from antenna element 13 is conducted through a wave-guide 18 and through a 90° phase-shifting device 20, to a terminal 21 of a Magic-Tee 22. This phase shifting device may be any conventional circuit, for example, an extra quarter-wave length of wave-guide, capable of producing a 90° shift in the phase of $E_1$ relative to the voltage $E_2$ (see also Figure 5).

The voltage $E_2$ from antenna element 12 is conducted by a wave-guide 24 into a terminal 26 of the Magic-Tee 22. The operation of the Magic-Tee is well known, and is described in the book Principles of Microwave Circuits, volume 8 of the M.I.T. Radiation Laboratory Series (McGraw-Hill, 1948). As explained at pages 306–308 of that book, the Magic-Tee delivers voltages proportional to the sum and difference of the two input signals. Thus, the output voltage $E_3$ at terminal 38 is the vector sum of one-half of $jE_1$ and one-half of $E_2$.

$$E_3 = \frac{E_2 + jE_1}{2} \quad (1)$$

This signal voltage $E_3$ is shown vectorially in Figure 6. It will be noticed that $E_3$ is at an angle $\alpha$ with respect to the horizontal reference line, the size of this angle $\alpha$ being dependent upon the relative magnitudes of the received voltages $E_1$ and $E_2$, and accordingly is independent of changes in the aspect of the plane which change the amount of reflected energy in both beams. Also angle $\alpha$ is independent of changes in the atmospheric conditions between the target and the antenna assembly, for such changes would not affect the relative magnitudes of voltages $E_1$ and $E_2$.

A signal voltage $E_4$ appears at another output terminal 42 of the Magic-Tee 22 and is the vector difference of one-half of $jE_1$ and one-half of $E_2$:

$$E_4 = \frac{E_2 - jE_1}{2} \quad (2)$$

$E_4$ is shown vectorially in Figure 7, making an angle $\beta$ with the horizontal reference line. This angle is the same angle as minus $\alpha$, and will be so written, and like angle $\alpha$ is dependent only upon the relative magnitudes of $E_1$ and $E_2$ and is independent of plane aspect or atmospheric conditions.

The voltage $E_3$ is conducted by a wave-guide 44 into a limiting receiver 46 where the voltage $E_3$ is amplified and limited to a standard magnitude such as, say, K volts. This amplification and limitation preserve the angle $\alpha$ and, thus, result in an output voltage $E_5$ (see also Figure 8), which may be expressed as:

$$E_5 = K \frac{E_3}{|E_3|} \quad (3)$$

Since $E_5$ is of standard magnitude and is positioned with a phase angle $\alpha$, the angle $\alpha$ is a measure of the relative magnitudes of $E_1$ and $E_2$. This voltage $E_5$ is fed, for example, by a coaxial cable 48, into a hybrid coil 52.

The voltage $E_4$ which appears at terminal 42 of Magic-Tee 22 is conducted by a wave-guide 54 to a limiting receiver 56 which amplifies and limits the signal to produce an output voltage $E_6$ (Figure 9) of the same standard magnitude as voltage $E_5$.

Voltage $E_6$ can be expressed as:

$$E_6 = K \frac{E_4}{|E_4|} \quad (4)$$

and makes the same angle $-\alpha$ with the horizontal reference line as does the voltage $E_5$. Voltage $E_6$ is fed by a cable 58, through a phase shifting device 62, in which $E_6$ is shifted 90° in phase so that it becomes $jE_6$ (Figure 10), which is positioned at an angle $(-\alpha+90°)$ with respect to the horizontal reference line, and is then conducted to the hybrid coil 52, for example, by means of a coaxial cable 64.

The action of the hybrid coil 52 is well-known, as shown for example on page 306 of the book, Principles of Microwave Circuits, referred to above, and is similar to that of the Magic-Tee 22. A voltage $E_7$ (Figure 11) is produced at an output terminal 66 of the hybrid coil 52 and is proportional to the sum of the two input signals, thus:

$$E_7 = \frac{E_5 + jE_6}{2} \quad (5)$$

A voltage $E_8$ (Figure 12) proportional to the difference of the two input signals, is produced at an output terminal 68 of the hybrid coil:

$$E_8 = \frac{jE_6 - E_5}{2} \quad (6)$$

The voltage $E_7$ is passed through a detector 72 to produce a video pulse which controls the intensity of the electron beam striking a viewing screen 2A of a range-height indicator 74, for example, by controlling the bias on the control grid of a cathode-ray oscilloscope. The voltage $E_7$ is at a maximum when $|E_1|=|E_2|$ and becomes smaller when either voltage $|E_1|$ or $|E_2|$ is greater than the other voltage. In other words, $E_7$ is at a maximum when the target is mid-way between the two beams of radar energy and thus substantially at the axis of the parabolic reflector.

The voltage $E_8$ is not proportional to the ratio of the difference to the sum of the two received signals, but it is a direct monotonic function of this ratio, and, therefore, can be corrected to give the desired correction voltage. The voltage $E_8$, accordingly, is fed through a detector and nonlinear amplifier 76, the nonlinear characteristic of the amplifier being designed so as to compensate for the form of the energy intensity distribution in the two radar beams at different angles with respect to the axis of the beams. The video pulse delivered by the detector-amplifier 76 is a measure of the vertical angular displacement of the direction of the target from the direction of the axis of the antenna-reflector assembly. In order to convert this angular measure into the actual displacement at a given range, it is necessary to multiply this pulse voltage by a voltage $E_R$ which is proportional to range. The signal from detector 76, therefore, is fed into a modulator 78 where it is multiplied by the voltage $E_R$ which is provided by the transmitter 9 over a cable 82. The correction voltage from the modulator 78 is applied to the range-height indicator 74 to deflect the path of the cathode ray beam whenever a target is within the energy pattern from the antenna assembly and displaced vertically from the axis of the reflector. The cable 82 is coupled also to the indicator 74 and provides the range data for the cathode ray sweep circuit. Another cable 84 transmits synchronizing pulses from the transmitter 9 to the sweep circuit of the range-height indicator 74.

The improvement which results from presenting the data in accordance with the invention can be seen by comparing the displays of Figures 1 and 2. In Figure 2 the dotted lines $a, b, c, d, e$ represent the scanning paths of the cathode ray beam. Each scanning path begins at the origin "O," representing zero height and zero horizontal range, and progresses upwardly and across to the opposite side of the screen. These scanning sweeps progress at an angle depending upon the inclination of the reflector axis, and at a rate such that at any instant the reception of reflected energy from a target will cause a target-indicating mark to appear at the proper range (measured along the scanning path from the origin) and at the apparent direction of the target.

Assuming that the antenna assembly is making a vertical scanning sweep beginning near the horizon and sweeping upwardly, then the scanning paths will progress in succession across the presentation screen from the origin at continuously increasing inclinations. Assuming that a target is at the azimuth of the antenna-reflector assembly, then at some instant the aircraft target will appear on the fringe of the radar pattern (as the pattern begins to sweep past the aircraft) much as a moving searchlight beam first "picks up" objects in its fringe as the searchlight beam sweeps by. In the conventional arrangements, at this instant some marking energy will appear on the screen, as on scanning path B of Figure 1. Subsequent reception of energy reflected from the succeeding pulses will cause the arcuate line 8 to appear on the screen and the true height and horizontal range of the aircraft must be estimated from the center of the arc 8.

In this embodiment of the invention, the correction voltage from modulator 78 serves to deflect the paths of the scanning sweeps whenever a target is within the radar pattern and at a vertical displacement from the reflector axis, and the deflection is of the proper magnitude to place the marking energy on the radar viewing screen 2A in the true relative position of the target.

Thus, with the same assumed conditions as were present in a description of Figure 1, a target appears within the fringe of the radar pattern as the beam is scanning path $b$ on the viewing screen 2A. At the instant when the marking energy is applied to the viewing screen, the scanning beam line is deflected upwardly so that the marking energy is placed at point 8A in the true relative target position. Successive scanning paths are also deflected upwardly, each successive path being deflected slightly less because the increasing inclination of the antenna-assembly continually causes the axis of the reflector to point more nearly in the direction of the aircraft, so that the ratio of the amplitude of the received signals becomes more nearly unity and the correction deflection voltage becomes smaller, causing all of the marking energy to fall on the viewing screen 2A at point 8A. At the instant when the target is at no vertical displacement from the axis of the reflector, the scanning path on viewing screen 2A follows a straight line, that is, when the target is effectively "dead center" of the beam, no correction deflection voltage is produced. As the radar pattern sweeps on past the target, the target appears nearer the opposite fringe of the radar pattern, and the downward correction deflection of the scanning paths becomes successively greater, causing the successive impulses of marking energy to continue to fall on point 8A. At the instant when the target is leaving the fringe of the radar pattern, the beam traverses the scanning line $c$ and is deflected downwardly to position the last bit of marking energy at point 8A for the scanning cycle under consideration.

It is seen that all of the marking energy relating to the given target under consideration forms at the small dot 8A upon viewing screen 2A. If other targets were at the azimuth of the given aircraft, then other small dots would also be made at the appropriate relative positions on the viewing screen 2A. In the case of each target indication all of the marking energy relating to the given target would fall upon a small dot-like area.

This dot-like presentation has the advantages that the position of the target is presented with accuracy and certainty so that there is no need for an observer to estimate the true relative position of the target. Also, the marking energy is all concentrated at one spot, causing a more brilliant presentation more readily seen under normal lighting conditions in the radar observation room.

In the embodiment of the invention shown in Figure 13, the sum and difference signals from the Magic-Tee 22 are fed, respectively, into mixer and I.F. amplifier units 92 and 94, the 90° phase shifting device 20 being omitted from the arrangement shown in Figure 2. The signals are mixed with suitable auxiliary signals to produce signals of a frequency capable of being handled by the I.F. amplifier portions of the units 92 and 94.

The signal $E_c$ from I.F. amplifier unit 92 is fed into an AVC (automatic volume control) circuit and amplifier 96, which produces a direct voltage control signal which is a function of the magnitude of the input signal $E_1+E_2$. This signal is applied to the I.F. amplifier portions of both units 92 and 94 to vary their gain by means well known in the art. The AVC amplifier 96 and control arrangement is adjusted so that the magnitude of the output voltage $E_c$ from I.F. amplifier unit 92 is maintained substantially constant. Although a backward-acting AVC arrangement has been indicated, it is apparent that a forward-acting system can be employed and, in some arrangements, even more precise regulation of the voltage $E_c$ obtained.

The two amplifier units 92 and 94 are arranged to have identical characteristics, and because of their common AVC circuit will at all times have equal gains. Thus, it is apparent that the output signal from I.F. amplifier unit 94 will be a direct function of the magnitude of the difference input signal, $E_1-E_2$, and, because its gain is controlled inversely with the magnitude of the sum signal, will be an inverse function of the sum signal, $E_1+E_2$.

The resulting correction signal from amplifier unit is then multiplied by a suitable quantity proportional to the target range and fed into the range-height indicator 74.

Although the latter arrangement is, in some respects, simpler and more straight-forward than that shown in Figure 2, I prefer to use the arrangement of Figure 2 which avoids the necessity for providing and maintaining two identical I.F. amplifiers.

Figure 14 shows, schematically, a gate circuit for use in an altitude-layer-surveillance display. An altitude-layer-surveillance display is a type of display in which the radar data is presented on a number of separate viewing screens each limited to the presentation of radar targets within a predetermined horizontal layer of the atmosphere. This type of display is particularly useful for airports where the control tower must know the position of every plane in the traffic pattern over the field. By means of the altitude-layer-surveillance type of radar, the control tower can instantly tell the height and azimuth of all planes within a fixed radius of the field within various altitude layers above the field. These layers, for-example, might be from 0 to 1,000 feet, 1000 to 2000 feet, from 2000 to 3000 feet, etc.

However, unless the radar system is capable of determining the exact altitude of each target, it cannot properly route the signals representing targets near the separation points of the altitude layers to the correct layer-display system. In the arrangement shown in Figure 14, advantage is taken of the present invention to insure that the incoming signals are routed to the proper layer display and only to that display, as well as to correct the visual display itself as described in connection with Figure 2.

The system shown in Figure 14 includes three electronic switches, generally indicated within the broken lines at 102, 104, and 106, which are for the purpose of routing the intensity control signals (the sum of the received signals) to the correct altitude layer display, four of which are indicated in block form, respectively, at 108, 112, 114, and 116.

The sum signals from a source, indicated in block form at 118, which may, for example, comprise the detector 72 of Figure 2, are applied as positive pulses to the control grid 124 of a pentode vacuum tube 126 which serves as a high impedance current source for the electronic switch 102, the source 118 being connected also to a common ground circuit to provide a return path for the signals. The cathode 128 of the tube 126 is connected to ground through a bias resistor 132, which limits the flow of current through the tube, and its suppressor grid 134 is connected to the cathode and its screen grid 136 is connected to a positive voltage terminal 138 of a conventional rectifier-filter power supply, indicated in block form at 142, which is energized from alternating current supply lines 144, the negative connection being completed from a grounded terminal 146 through the common ground circuit.

This pentode tube 126 is connected in series with, and controls the total amount of current through, a high-m$\mu$ twin triode vacuum tube 148, the anode 152 of the pentode tube 126 being connected directly to the two cathodes 154 and 156 of the twin tube 148.

The tube 148 is arranged to provide two alternate signal paths, depending upon which half of the tube is carrying current. If the control grid 158 of the first section is less negative than the control grid 162 of the second section, substantially all of the current will flow through the first section and the signal will be applied to the altitude layer display 108, which indicates targets of less than 1000 feet altitude. If the control grid 162 of the second section is less negative than the control grid 158, substantially all of the signal current will be transferred to the next electronic switch 104.

In order to control the action of tube 148, the control grid 158 of the first section is connected to an adjustable contact 163 of a voltage dividing resistor 164 connected between a positive voltage terminal 166 of power supply 142 and ground. The anode 168 of this section is connected through a plate-load resistor 172 to a positive voltage supply lead 173 from a positive terminal 174 of the power supply 142, and is coupled through a condenser 176 to the altitude layer display 108.

The bias voltage which is applied to the control grid 158 is adjusted to be equal to a vertical sweep voltage corresponding to an altitude of 1000 feet.

The control grid 162 of the second section is connected through a common grid supply lead 178 and an isolating resistor 182 to an actual source of sweep voltage 184. This sweep voltage is derived from the radar transmitter 9 and is the product of a voltage proportional to range and the sine of the angle ($\theta$) of inclination of the antenna and accordingly is proportional to the altitude of a target provided the target is "dead-center" of the radar beam. In order to correct this signal when the target is above or below the center of the radar beam, a correction voltage which is proportional to the product of the range and the ratio of the difference and sum signals from the antenna is applied from a source 186, which may, for example, be the signal from the modulator 78 of Figure 2, through an isolating resistor 188 to the grid supply lead 178. The sweep voltage from source 184 is positive with respect to ground and the correction voltage from source 186 may be either positive or negative depending upon whether the target is above or below the axis of the antenna, and it is the total voltage of these two signals which is applied to grid 162 to determine the routing of the target echo.

The anode 196 of the second section of tube 148 is connected through a plate-load resistor 198 to the positive voltage supply lead 173, and through a coupling condenser 202 and a phase shifting device 204 to the control grid 124A of a pentode tube 126A of the succeeding electronic switch 104.

In operation, when the angle of inclination of the antenna is low the vertical sweep voltage will increase steadily for a predetermined period and will then return substantially instantly to zero value. This process will be repeated of course in synchronism with the transmission of pulses by the radar transmitter. As the angle of inclination of the radar antenna increases, the sine increases so that the sweep voltage reaches a correspondingly higher voltage in the predetermined period of time. No correction voltage is present, of course, unless a target is present.

Now assume that the echo signal from a target is received and that at the first instant of reception the target is above the axis of the antenna beam. A positive pulse is produced by the source 118, proportional to the sum of the two received signals and is applied to the control grid 124 of the pentode tube 126. This change in grid voltage increases the amount of plate current through the pentode and, accordingly, the amount of current through the twin triode tube 148. Because of the characteristics of a pentode its plate voltage remains substantially constant so that the positive bias produced at cathodes 154 and 156 does not change appreciably when the target impulse is received. However, the increased current which is caused to flow through tube 148 will flow through either the first or second section depending upon the relative potentials of the control grids 158 and 162. If the actual height of the target is less than 1000 feet, the sweep voltage from source 184 plus the correction voltage from source 186 will be less than the fixed voltage on grid 158, and the signal current will flow through the first section of tube 148 and the target will be indicated on the layer display 108. No signal will be relayed to the remaining electronic switches and the target will not appear on the other layer displays.

If, however, the target is above 1000 feet, the sweep voltage plus the correction voltage on grid 162 will exceed the fixed voltage on grid 158 and substantially all of the signal current will flow through the second section of the tube to be relayed to the next electronic switch 104, and no indication of the target will appear on the first altitude layer display 108.

The electronic switches 104 and 106 operate in the same manner as the switch 102, as indicated by the similarly numbered parts. The signal pulse, however, which appears at anode 196 of the second section of tube 148 is negative, whereas the pentode tube 126A of the electronic switch 104 requires a positive pulse, such as was applied initially to the first electronic switch 102. For this reason, the phase of the signal from anode 196 is reversed before being applied to the grid 124A of tube 126A, for example, by means of an additional vacuum tube.

In the second electronic switch the control grid 158A is biased at a voltage corresponding to the sweep voltage at an altitude of 2000 feet, so that only targets between 1000 and 2000 feet are indicated by the layer display 112, signals representing targets above 2000 feet being relayed to electronic switch 106, the operation of which is identical to the preceding switches except that the control grid 158B of the twin triode tube 148B is biased to a still higher potential corresponding to the sweep voltage at 3000 feet.

The output signal from electronic switch representing targets above 3000 feet is shown or fed into the layer display 116, although it is apparent that additional switching arrangements can be added to permit the use of additional altitude layer displays.

From the foregoing, it will be apparent that the radar receiving and display systems embodying the invention are well adapted to attain the ends and objects hereinbefore set forth or made apparent from the description and to be manufactured economically since the separate components are for the most part available from already-existing commercial production, the various circuits and sequences of procedures being subject to a variety of modifications as may be desirable in adapting the invention to different applications. It is also to be observed that in adapting the invention to a particular use, it may be advantageous to make use of certain features of the invention without a corresponding use of other features. It is to be understood that the foregoing examples and descriptions are given for the purpose of explaining the invention in accordance with the requisite statutes and that they are to be considered as illustrative and not in a limiting sense.

I claim:

1. In a radar system for detecting and locating distant targets wherein two signals are reflected by the target and utilized to control the intensity of an electron beam which is positioned in accordance with a separately generated deflection voltage, the method of correcting the indicated position of said target comprising the steps of receiving first and second echo signals, electrically combining said signals to produce a correction voltage which is a function of the ratio of the difference in the magnitude of said signals to the sum thereof, and combining said correction voltage with said reflection voltage.

2. In a radar system for detecting and locating distant targets wherein two signals are reflected by the target and utilized to control the intensity of an electron beam which is positioned in accordance with a separately generated deflection voltage, the method of correcting the indicated position of said target comprising the steps of receiving first and second echo signals, electrically combining said signals to produce a first voltage which is a function of the ratio of the difference in the magnitudes of said signals to the sum thereof, electrically multiplying said first voltage by a second voltage proportional to the range of the target from which said signals were reflected, and to produce a correction signal, and combining said correction signal with said deflection voltage.

3. In a radar system for detecting and locating distant targets wherein two signals are reflected by the target and utilized to control the intensity of an electron beam which is positioned in accordance with a separately generated deflection voltage, the method of correcting the indicated position of said target comprising the steps of receiving first and second echo signals, electrically combining said signals to produce a correction voltage which is a function of the ratio of the difference in the magnitudes of said signals to the sum thereof, generating an electron-beam-deflecting voltage which is a function of the range of said target, combining said correction voltage with said deflecting voltage, and applying said corrected deflecting voltage to the sweep circuit of a cathode-ray oscilloscope.

4. In a radar system for detecting and locating distant targets wherein two signals are reflected by the target and utilized to control the intensity of an electron beam which is positioned in accordance with a separately generated deflection voltage, the method of correcting the indicating position of said target comprising the steps of radiating first and second radar signals along an overlapping path, receiving first and second echo signals from a target within said overlapping path, electrically combining said signals to produce a correction voltage which is a function of the ratio of the difference to the sum of said signals, and combining said correction voltage with said deflection voltage.

5. In a radar system for detecting and locating distant targets wherein two signals are reflected by the target and utilized to control the intensity of an electron beam which is positioned in accordance with a separately generated deflection voltage, the method of correcting the indicated position of said target comprising the steps of radiating first and second radar signals along an overlapping path, receiving first and second echo signals from a target within said overlapping path, electrically combining said signals to produce a first voltage which is a function of the ratio of the difference to the sum of said signals, electrically multiplying said first voltage by a second voltage proportional to the range of the target from which said signals were reflected to produce a correction voltage, generating an electron-beam deflecting voltage which is a function of the range of said target, combining said correction voltage with said deflecting voltage, and applying said corrected deflecting voltage to the sweep circuit of a cathode-ray oscilloscope.

6. In radar apparatus for visually indicating the presence and relative location of distant targets within a radar beam wherein two echo signals are received simultaneously from a single target, the method of correcting the indicated position of a target asymmetrically positioned with respect to the radar beam comprising receiving first and second echo signals, combining said signals in phase quadrature to obtain the vector sum and vector difference thereof, separately amplifying the sum and difference signals, limiting the magnitudes of the amplified sum and difference signals to equal values, re-combining the limited signals in phase quadrature to obtain the vector difference thereof, combining the resulting difference signal with a range signal, and applying the resultant signal as a correction voltage to the sweep circuit of a radar display.

7. In radar apparatus for visually indicating the presence and relative location of a target within a radar beam wherein two echo signals are received simultaneously from a single target, the method of correcting the indicated position of a target asymmetrically positioned with respect to the radar beam comprising receiving first and second echo signals, combining said signals in phase quadrature to obtain the vector sum and vector difference thereof, separately amplifying the sum and difference signals, limiting the magnitudes of the amplified sum and difference signals to equal values, re-combining the limited signals in phase quadrature to obtain the vector sum and vector difference thereof, controlling the intensity of an electron beam in accordance with the magnitude of the last-said sum signal, combining the last-said difference signal with a range signal, and controlling the deflection of an electron beam in accordance with the value of said combined difference and range signals.

8. In radar apparatus for visually indicating the presence and relative location of a target within a radar beam wherein two echo signals are received from a target, the method of correcting the indicated position of a target asymmetrically positioned with respect to the axis of said radar beam comprising receiving first and second echo signals, combining said signals in phase quadrature to obtain the vector sum and vector difference thereof, separately amplifying the sum and difference signals, limiting the magnitudes of the amplified sum and difference signals to equal values, re-combining the limited signals in phase quadrature to obtain the vector difference thereof, detecting said re-combined signal to obtain the video envelope thereof, electrically multiplying said video signal by a range signal to obtain a signal proportional to the product thereof, and applying said product signal as a correction voltage to the sweep circuit of a radar display system.

9. In radar apparatus for visually indicating the presence and relative location of a target within a radar beam wherein two echo signals are received from a single target, the method of correcting the indicated position of a target asymmetrically positioned with respect to the radar beam comprising radiating first and second signals along overlapping paths, receiving first and second echo signals reflected by a target within said overlapping path, combining said signals in phase quadrature to obtain the vector sum and vector difference thereof, separately amplifying the sum and difference signals, limiting the magnitudes of the amplified sum and difference signals to equal values, re-combining the limited signals in phase quadrature to obtain the vector sum and the vector difference thereof, combining the resulting difference signal with a range signal, and applying the resultant combined signal to the sweep circuit of a radar display system as a correction factor.

10. In a radar system in which two signals are radiated simultaneously along two separate overlapping paths and when reflected by a target to two separate receiving elements are utilized to control a beam of electrons to produce a visual indication of the presence and location of the target, the method of correcting the presentation of such targets which are not positioned symmetrically with respect to the said paths so that a stronger signal is reflected to one of said receiving elements than to the other, said method comprising the steps of receiving first and second echo signals, shifting said first signal 90° to obtain a third signal, electrically combining said second and third signals to obtain fourth and fifth signals proportional to the vector sum and difference, respectively, of said second and third signals, amplifying said fourth and fifth signals, limiting said fourth and fifth signals to a common amplitude to produce sixth and seventh signals, respectively, shifting the phase of said seventh signal 90° to obtain an eighth signal, electrically combining said sixth and eighth signals to obtain a ninth signal proportional to the vector difference of said sixth and eighth signals, and controlling deflection of a target indicating electron beam in accordance with the value of said ninth signal.

11. In a radar system in which two signals are radiated simultaneously along two separate overlapping paths and when reflected by a target to two separate receiving elements are utilized to control a beam of electrons to produce a visual indication of the presence and location of the target, the method of presenting such targets in their true relative positions including the steps of receiving first and second echo signals, shifting said first signal 90° to obtain a third signal, electrically combining said second and third signals to obtain fourth and fifth signals proportional to the vector sum and difference, respectively, of said second and third signals, amplifying said fourth and fifth signals, limiting said fourth and fifth signals to a common amplitude to produce sixth and seventh signals, respectively, shifting the phase of said seventh signal 90° to obtain an eighth signal, electrically combining said sixth and eighth signals to obtain ninth and tenth signals proportional to the vector sum and difference, respectively, of said sixth and eighth signals, detecting said ninth signal to produce an eleventh video-envelope signal, controlling the intensity of an electron beam in accordance with the value of said eleventh signal, combining said tenth signal with a range voltage to produce a twelfth signal proportional to the product thereof, and controlling deflection of said electron beam in accordance with the value of said twelfth signal.

12. In a radar system having a double-lobed antenna beam and a cathode-ray presentation system in which the position and brightness of a target-indicating mark are controlled, respectively, by electron-beam sweep and intensity circuits, the method of correcting the sweep circuit to cause it to correctly indicate the position of the target which is within, but not centered with respect to, said antenna beam comprising the steps of receiving first and second separate echo signals each from its respective lobe of said antenna beam, adding and subtracting said signals to obtain sum and difference signals, generating a control voltage proportional to said sum signal, amplifying said difference signal, controlling the extent of said amplification as a funciton of said control voltage, and applying said amplified difference signal as a correction voltage to said sweep circuit.

13. In a radar system having a double-lobed antenna beam and a cathode-ray presentation system in which the position and brightness of a target-indicating mark are controlled, respectively, by electron-beam sweep and intensity circuits, the method of correcting the sweep circuit to cause it to correctly indicate the position of a target which is within, but not centered with respect to, said antenna beam comprising the steps of receiving first and second separate echo signals each from its respective lobe of said antenna beam, adding and subtracting said signals to obtain sum and difference signals, generating a control voltage proportional to said sum signal, amplifying said difference signal, controlling the extent of said amplification in inverse proportion to the magnitude of said control voltage, and applying said amplified difference signal as a correction voltage to said sweep circuit.

14. In a radar system having a cathode-ray type display wherein an electron beam strikes a fluorescent surface to indicate the presence and location of a target object, the method of correcting the indicated position of targets including the steps of continually changing the direction of an electrical field so as to cause an electron beam therein to follow a predetermined path and periodically scan a predetermined area while directing said beam to strike a fluorescent surface, controlling the intensity of said electron beam in accordance with the intensity of a received signal to indicate the presence of a target, and momentarily deflecting said beam from said predetermined scanning path at the instant said signal is received to cause said target to be indicated on said screen in its true relative position.

15. In a radar system having a cathode-ray type presentation arrangement, the method of correcting the indicated position of target objects detected by the radar system comprising the steps of producing a periodic electron-beam-controlling field of such force and direction as to cause an electron beam therein to scan progressively a predetermined sequence of paths, momentarily altering said field in such manner as to cause an electron beam therein to digress momentarily from its predetermined scanning path at a position removed from said last-said path, and momentarily altering said field during the scanning of subsequent paths so as to cause an electron beam therein to digress momentarily from said subsequent paths by gradually changing amounts so as to reinforce said target indication at said first-said position.

16. In a radar system having an antenna system for radiating a directed beam of energy and means for receiving reflected portions of said energy, the method of routing target-indicating data to the correct one of two or more altitude-layer display systems, comprising the steps of generating an electron-beam-intensity control signal, generating an echo signal which is a function of the angle of inclination of the radar antenna from a fixed reference line, generating a correction signal which is a function of the displacement of said target from the longitudinal axis of the radar beam of said antenna, generating a fixed altitude-display control signal, combining said echo and correction signals, and routing said electron-beam-intensity control signal over either of two alternate paths in accordance with the value of said combined echo and correction signals with respect to the value of said altitude-display signal.

17. In a radar system having an antenna system for radiating a directed beam of energy and means for receiving reflected portions of said energy, the method of routing target-indicating data to the correct one of two or more altitude-layer display systems comprising the steps of radiating first and second radar signals, receiving first and second separate echo signals, generating a variable altitude-control signal proportional to the product of the sine of the angle of inclination of a radar beam with respect to a fixed reference line and the distance between the radiating-receiving antenna and a target object to be indicated on an altitude-layer display, generating a correction signal which is a function of the product of said distance and the ratio of the difference to the sum of said two received signals, combining said variable altitude-control signal and correction signal, generating a fixed altitude-control signal, comparing the magnitude of said combined signal with the magnitude of said fixed altitude-control signal, generating an intensity-control signal responsive to the presence of said target within said beam, and routing said intensity-control signal over one of two paths in accordance with the relative magnitudes of said combined signal and said fixed altitude-control signal.

18. Apparatus for correcting the display image in a radar system comprising a radar-display system having intensity-control and deflection-control circuits, first and second receiving antennas, a first ninety-degree phase-shifter coupled to said first antenna, a Magic-Tee having two input and two output circuits, means connecting said ninety-degree phase-shifter to one of said Magic-Tee input circuits, means coupling said second antenna to the other Magic-Tee input circuit, first and second amplifier-limiters coupled, respectively, to said Magic-Tee output circuits, a second ninety-degree phase shifter connected to the output of said first amplifier-limiter, a hybrid-coil having two input and two output circuits, means coupling said second amplifier and said second phase-shifter, respectively, to said input circuits of said hybrid coil, and means coupling one of said hybrid-coil output circuits to said intensity-control circuit and the other of said hybrid-coil output circuits to said deflection-control circuit.

19. Apparatus for correcting the display image in a radar system comprising a radar-display system having intensity-control and deflection-control circuits, first and second receiving antennas, a first ninety-degree phase-shifter coupled to said first antenna, a Magic-Tee having two input and two output circuits, means connecting said ninety-degree phase-shifter to one of said Magic-Tee input circuits, means coupling said second antenna to the other Magic-Tee input circuit, first and second amplifier-limiters coupled, respectively, to said Magic-Tee output circuits, a second ninety-degree phase shifter connected to the output of said first amplifier limiter, a hybrid-coil having two input and two output circuits, means coupling said second amplifier and said second phase-shifter, respectively, to said input circuits of said hybrid coil, a modulator having an amplification factor proportional to the target range, means coupling one of said hybrid output circuits to said modulator, means coupling said modulator to said deflection-control circuit, and means coupling the other of said hybrid-coil output circuits to said intensity-control circuit.

20. In a radar system wherein targets are detected by means of a continually sweeping radar beam, having first and second mutually displaced overlapping components, and indicated visually on a fluorescent screen of a cathode-ray tube, apparatus for producing a correction voltage for application to the deflection circuits of the cathode-ray tube to cause said indications to appear in the true relative positions of the targets, said apparatus comprising means for combining first and second received signals associated, respectively, with said first and second beam components to produce sum and difference signals proportional, respectively, to the sum and difference of said first and second signals, first and second amplifiers each having an input and an output circuit, means connecting said sum and difference signals to the input circuits of said first and second amplifiers, respectively, and a control-signal generator arranged to simultaneously control the gains of said amplifiers so as to hold the voltage at the output circuit of said first amplifier constant, thereby causing said second amplifier to deliver a correction voltage proportional to the ratio of said difference and sum signals.

21. A gating circuit comprising first and second electronic switches, first and second radar altitude-layer displays, coupled, respectively, to said first and second electronic switches, said first electronic switch including a first vacuum tube arranged to transmit signals to said first altitude-layer display, a second vacuum tube arranged to transmit signals to said second electronic switch, a source of fixed voltage coupled to said first tube for controlling its conductivity, a source of sweep voltage, a source of altitude-correction voltage, circuit means combining said sweep and correction voltages and coupling the combined voltage to said second tube for controlling its conductivity, a source of target-indicating signal, and means applying said signal simultaneously to said first and second tubes, whereby said signal is transmitted through the one of said tubes having the greatest conductivity and thereby coupled to said first altitude-layer display or routed to said second electronic switch.

22. In a radar system having means for radiating two overlapping beams and an antenna system for receiving two signals reflected by a single target, a gating circuit for routing the received signal to the correct altitude layer display comprising first and second electronic switches, first and second radar altitude-layer displays, coupled, respectively, to said first and second electronic switches, said first electronic switch including a first vacuum tube arranged to transmit signals to said first altitude-layer display, a second vacuum tube arranged to transmit signals to said second electronic switch, a source of fixed voltage coupled to said first tube for controlling its conductivity, a source of sweep voltage, a source of altitude-correction voltage which is a function of the ratio of the difference to the sum of said received signals, circuit means combining said sweep and correction voltages and coupling the combined voltage to said second tube for controlling its conductivity, a source of target-indicating signal, and means applying said signal simultaneously to said first and second tubes, whereby said signal is transmitted through the one of said tubes having the greatest conductivity and thereby coupled to said first altitude-layer display or routed to said second electronic switch.

23. In a radar system, apparatus comprising first and second antenna receiving elements having angularly directed radiation patterns and arranged to produce first and second signals, receiving means coupled to said antennas and arranged to produce third and fourth signals which are functions, respectively, of the sum and difference of said first and second signals, means connected to said receiving means arranged to produce a fifth signal which is a function of the ratio of said third and fourth signals, range measuring means producing a control voltage which is a function of the range of the target producing said first and second signals, means combining said fifth signal with said control signal to produce a correction signal, and a radar target indicator having a visible target-indicating pip and including means under the control of said correction signal for displacing said pip in accordance with the value of said correction signal.

24. Apparatus for correcting the position-indicating potentials in a radar system comprising first and second receiving antenna elements, first computer means coupled to each of said antennas and arranged to produce first and second signals which are functions respectively of the sum and difference of the signals from said first and second antenna elements, amplitude limiting means coupled to the output of said computer means and producing from said first and second signals, respectively, third and fourth signals having equal amplitudes and different phase angles, second computer means arranged to combine said third and fourth signals in phase quadrature to produce fifth and sixth signals which are functions, respectively, of the sum and difference of said third and fourth signals, means generating a seventh signal which is a function of the range of the target being observed by the radar system, means for modifying said sixth signal in accordance with the value of said seventh signal to produce an eighth signal, and a visual display device having an electron beam control element under the control of said eighth signal.

References Cited in the file of this patent

UNITED STATES PATENTS

| | | |
|---|---|---|
| 2,445,895 | Tyrrell | July 27, 1948 |
| 2,456,666 | Agate et al. | Dec. 21, 1948 |
| 2,467,361 | Blewett | Apr. 12, 1949 |
| 2,483,097 | McIlwain | Sept. 27, 1949 |
| 2,509,207 | Busignies | May 30, 1950 |
| 2,543,081 | Watts et al. | Feb. 27, 1951 |

UNITED STATES PATENT OFFICE

CERTIFICATE OF CORRECTION

Patent No. 2,948,892                        August 9, 1960

Warren D. White

It is hereby certified that error appears in the printed specification of the above numbered patent requiring correction and that the said Letters Patent should read as corrected below.

Column 3, line 68, for "amplitude" read -- amplitudes --; column 4, line 15, for "approximate" read -- appropriate --; column 13, line 72, for "the", second occurrence, read -- a --.

Signed and sealed this 31st day of January 1961.

(SEAL)
Attest:

KARL H. AXLINE
Attesting Officer

ROBERT C. WATSON
Commissioner of Patents